United States Patent [19]
Dumont

[11] Patent Number: 6,009,322
[45] Date of Patent: Dec. 28, 1999

[54] AUTOMATED PRIVATE NUMBERING PLAN (PNP) SUBSCRIPTION PROVISIONING

[75] Inventor: Jim Dumont, Dollard des Ormeaux, Canada

[73] Assignee: Telefonaktiebolaget LM Ericsson (publ), Stockholm, Sweden

[21] Appl. No.: 08/897,302

[22] Filed: Jul. 21, 1997

[51] Int. Cl.⁶ ............................................. H04Q 3/00
[52] U.S. Cl. ........................ 455/411; 455/450; 455/461
[58] Field of Search .................................. 455/411, 450, 455/461, 464, 465, 466

[56] References Cited

U.S. PATENT DOCUMENTS 5,553,130  9/1996  Turner ....................................... 455/411

FOREIGN PATENT DOCUMENTS 0 689 334 A1  12/1995  European Pat. Off. ......... H04M 3/59

*Primary Examiner*—David R. Hudspeth
*Assistant Examiner*—Daniel Abebe
*Attorney, Agent, or Firm*—Smith & Danamraj, P.C.

[57] ABSTRACT

A method in a telecommunications network having a configuration management system, of automatically populating a Private Numbering Plan (PNP) subscription with PNP data. The method begins by defining a group comprising a plurality of members who subscribe to a PNP service, and automatically generating the PNP data for each of the plurality of group members when the group is defined. The PNP data may be generated by service management application software in the configuration management system. The PNP data may include in abbreviated number for each of the plurality of group members. The abbreviated numbers may be generated by several methods including incremental number generation, random number generation, or by extracting the last "X" digits of each group member's telephone number. The method then determines whether each generated abbreviated number is valid and unique. A network operator may override an automatically generated number by manually inputting an abbreviated number which is valid and unique.

18 Claims, 3 Drawing Sheets

AUTOMATED PRIVATE NUMBERING PLAN (PNP) SUBSCRIPTION PROVISIONING

BACKGROUND OF THE INVENTION

1. Technical Field of the Invention

This invention relates to telecommunication systems and, more particularly, to a system and method of automatically populating a group's Private Numbering Plan (PNP) subscription with the group members' data.

2. Description of Related Art

In existing telecommunication systems, all Wireless Intelligent Network (WIN) services are provisioned manually utilizing service management application software. One such service is the Private Numbering Plan (PNP). PNP is similar to Private Branch Exchange (PBX) dialing in wireline networks, but applies to a group of mobile subscribers in a cellular network. For Business Group subscriptions to the PNP service, manual provisioning includes the time consuming re-entry of all the group members' numbers followed by their associated abbreviated numbers, which may number in the thousands. Currently, to add a group, a data entry operator must enter an identifier for the group, enter a group name and address, create a group subscription, enter a list of subscriptions that belong to the group, add the members to the group, and then add an abbreviated number to the database for each member. This is a burdensome data entry task for system operators.

There are no known prior art teachings of a solution to the aforementioned deficiency and shortcoming such as that disclosed herein.

In order to overcome the disadvantage of existing solutions, it would be advantageous to have a method of automatically populating a group's PNP subscription with the group members' data at the time that the group members are defined. The present invention provides such a method.

SUMMARY OF THE INVENTION

So as to eliminate this data entry process, the present invention provides a method of automatically populating the PNP subscription of a group with the group members' data at the time that the group members are defined using the service management application software. The group members' data may consist of each group member's mobile phone number and an associated abbreviated number.

In one aspect, the present invention is a method in a telecommunications network having a configuration management system, of automatically populating a Private Numbering Plan (PNP) subscription with PNP data. The method begins by defining a group comprising a plurality of members who subscribe to a PNP service, and automatically generating die PNP data for each of the plurality of group members when the group is defined. The PNP data may be generated by service management application software in the configuration management system. The PNP data may include an abbreviated number for each of the plurality of group members.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention provides a method of automatically populating the PNP subscription of a group with the group members' data at the time that the group members are defined using the service management application software. The group members' data may consist of each group member's mobile phone number and an associated abbreviated number. The PNP service resides in a service control point (SCP). The software for the present invention resides in a network configuration management system which interfaces with the telecommunications network through the SCP. Thus, the method is independent of the type of network, and may be utilized in both radio telecommunications networks and wireline networks.

When the PNP subscription is created for a group, the data entry operator may specify the type of abbreviated number desired and the parameters for generating the abbreviated number, and the present invention automatically puts the data into the subscription utilizing various methods. PNP data can be derived from subscriber data which is already in the subscriber database in the system. Many different methods may be utilized, for example, to derive an abbreviated number from a member's mobile telephone number. The present invention may utilize one of the following exemplary methods:

a) Incremental Number Generation: utilize a sequence number starting from 'X ...'; e.g., if "X" is 1000, then the present invention automatically generates 1000, 1001, etc. as the abbreviated numbers for the members;

b) Random Number Generation: utilize a randomly generated abbreviated number of length 'X' using each group member's number as the root to ensure the abbreviated number is unique; and c) Last X Digits: utilize the last 'X' digits of each group member's number; e.g., if the group member's mobile telephone number is '9427138' and "X" is 4, then the present invention automatically generates '7138' as the abbreviated number.

Figure 1:
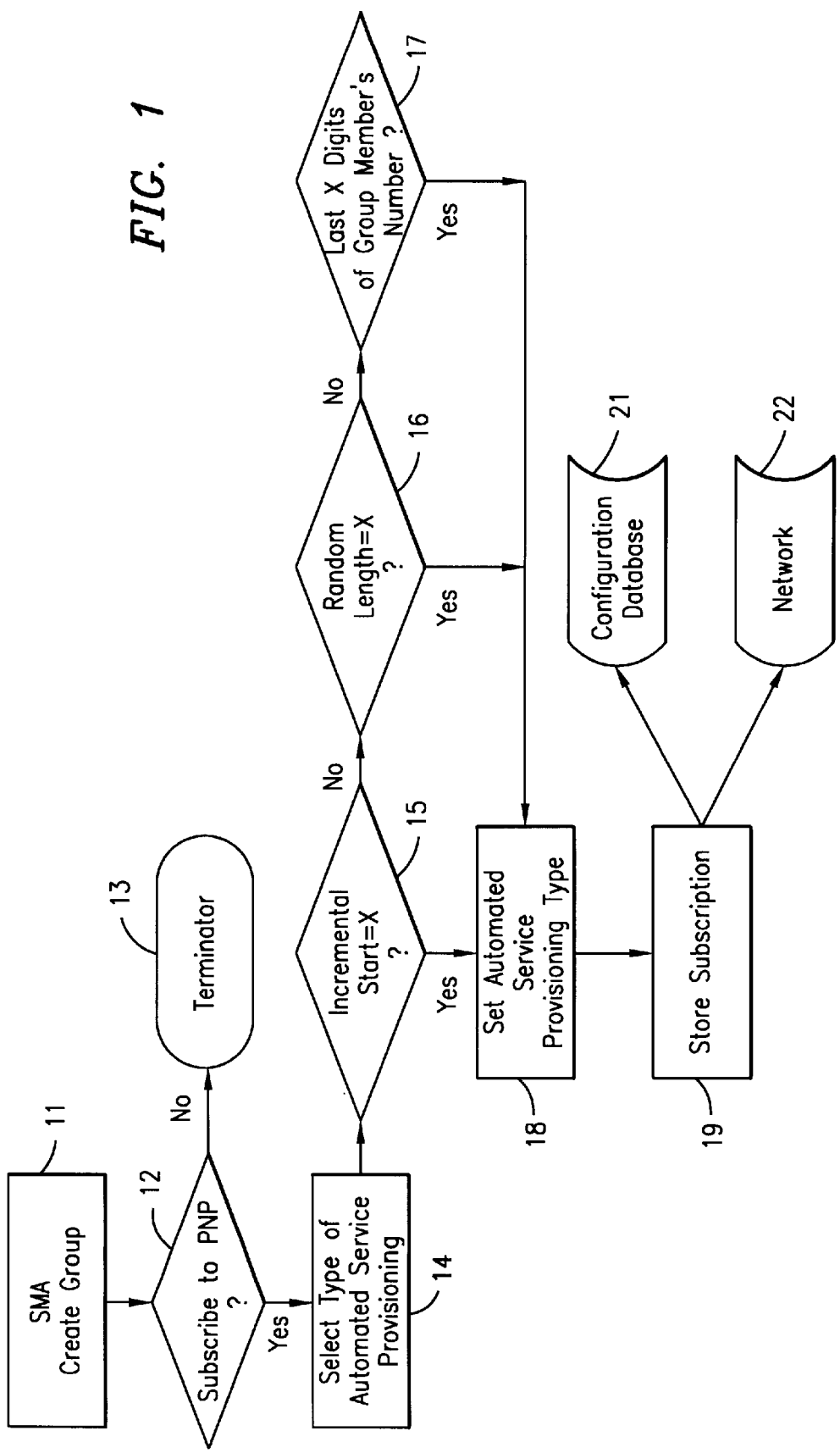
FIG. 1 is a flow chart illustrating the steps performed by the preferred embodiment of the automatic provisioning process of the present invention when adding a group.

FIG. 1 is a flow chart illustrating the steps performed by the preferred embodiment of the automatic provisioning process of the present invention when adding a group. At step 11, the network data entry operator enters an instruction to the service management application (SMA) software to create a group. The process then moves to step 12 where it is determined whether or not the group subscribes to the PNP service. If not, the process moves to step 13 where the automatic provisioning process is terminated. If, however, the group subscribes to the PNP service, the process moves to step 14 where the network operator selects the type of automated service provisioning desired.

The process then moves to step 15 where it is determined whether or not the network operator selected the incremental type of service provisioning and entered a starting value for "X". If not, the process moves to step 16 where it is determined whether or not the network operator selected the random type of service provisioning and entered a length for "X". If not, the process moves to step 17 where it is determined whether or not the network operator selected to utilize the last X digits of a group member's telephone number to provide the type of service provisioning and entered a length for "X". If any one of steps 15, 16, or 17 is yes, then the process moves to step 18 and sets the automated service provisioning type. The process then moves to step 19 where the subscription is stored in both the configuration system database 21 and the network database 22. The configuration system database 21 provides a backup for network data through the network's Operation Support System (OSS). The network database 22 is utilized during call setup, and resides in the SCP.

Figure 2:
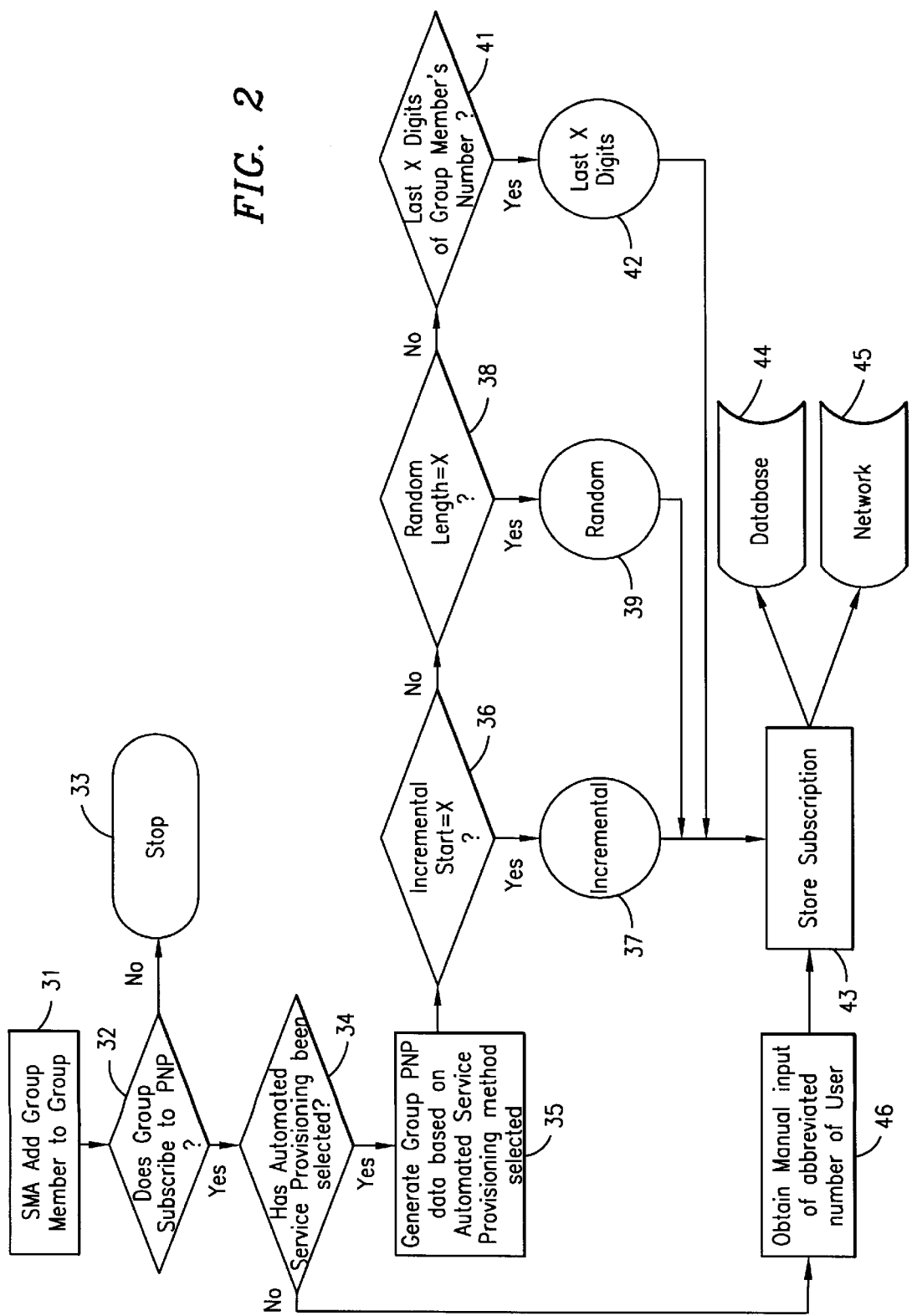
FIG. 2 is a flow chart illustrating the steps performed by the preferred embodiment of the automatic provisioning process of the present invention when adding a group member to a group.

FIG. 2 is a flow chart illustrating the steps performed by the preferred embodiment of the automatic provisioning process of the present invention when adding a group member to a group. At step 31, the network data entry operator enters an instruction to the service management application (SMA) software to add a group member to a group. The process then moves to step 32 where it is determined whether or not the group subscribes to the PNP service. If not, the process moves to step 33 where the automatic provisioning process is terminated. If, however, the group subscribes to the PNP service, the process moves to step 34 where it is determined whether or not the network operator has selected automated service provisioning. If automated service provisioning has been selected, the process moves, to step 35 where the process automatically generates group PNP data based on the type of automated service provisioning selected.

The process moves to step 36 where it is determined whether or not the network operator selected the random type of service provisioning and entered a length for "X". If yes, the process generates group PNP data based on the incremental method at 37. If not, the process moves to step 38 where it is determined whether or not the networld operator selected the random type of service provisioning and entered a length for "X". If yes, the process generates group PNP data based on the random method at 39. If not, the process moves to step 41 where it is determined whether or not the network operator selected to utilize the last X digits of a group member's telephone number to provide the type of service provisioning and entered a length for "X". If yes, the process generates group PNP data based on the last X digits method at 42. The process moves to step 43 where the subscription is stored in both the configuration system database 44 and the network database 45. If, however, it is determined at step 34 that the operator has not selected automated service provisioning, the process moves to step 46 where manual input of the group PNP data (e.g., the abbreviated number) is obtained from the operator. The process then moves to step 43 where the manually input subscription data is stored in both the configuration system database 44 and the network database 45.

Figure 3:
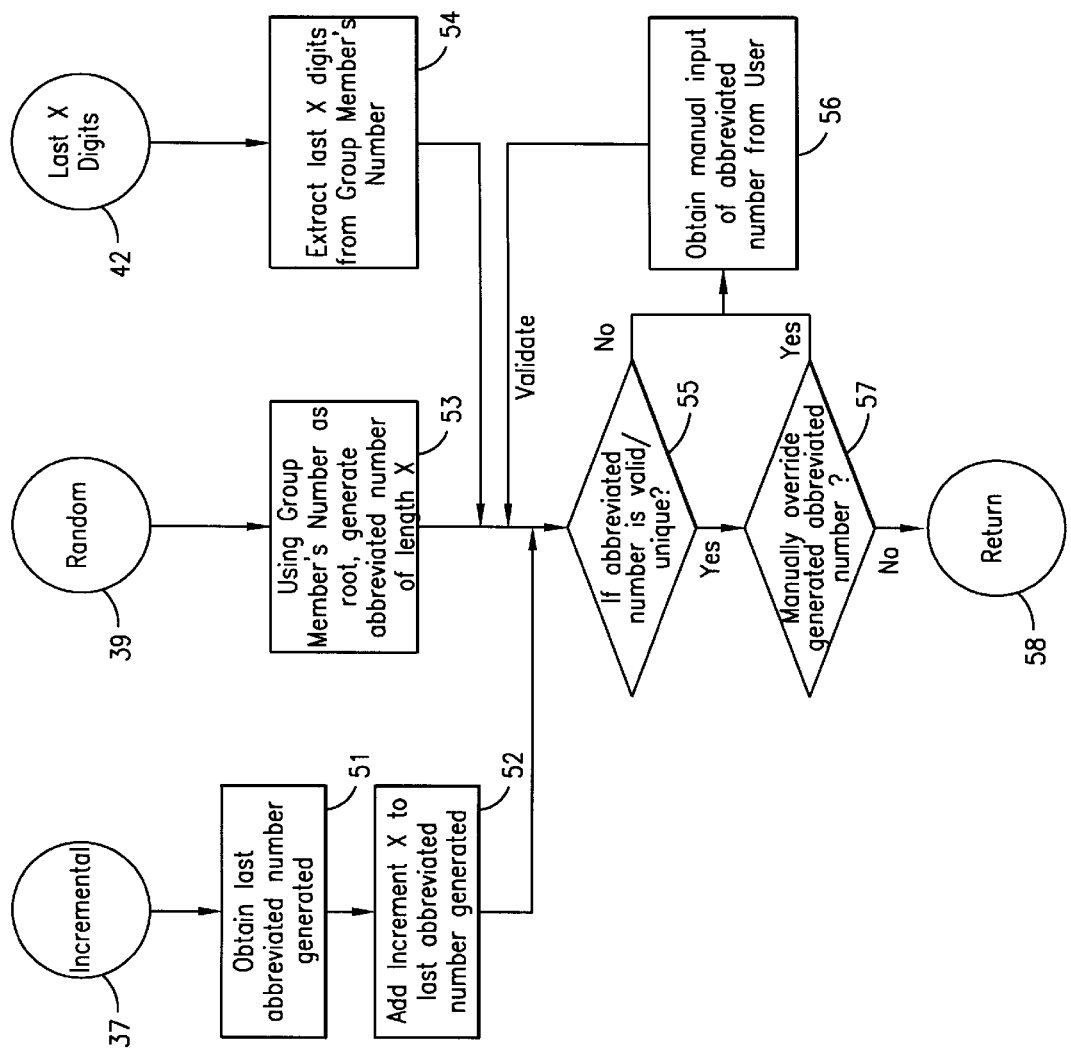
FIG. 3 is a flow chart illustrating the steps performed by the preferred embodiment of the automatic provisioning process of the present invention when generating PNP data.

FIG. 3 is a flow chart illustrating the steps performed by the preferred embodiment of the automatic provisioning process of the present invention when generating PNP data. The process continues from steps 37, 39, and 42 of FIG. 2. At step 37, the process generates group PNP data based on the incremental method. This process is begun at step 51, where the process obtains the last abbreviated number generated. At step 52, the increment X is added to the last abbreviated number generated to generate the next abbreviated number. At step 39, the process generates group PNP data based on the random method. At step 53, the process utilizes each group member's telephone number as a root from which to generate an abbreviated number of length X. At step 42, the process generates group PNP data based on the last X digits method. At step 54, the process extracts the last X digits from each group member's telephone number and utilizes those digits as the member's abbreviated number.

Whichever method is utilized, the process then moves to step 55 where it is determined whether or not each of the generated abbreviated numbers is valid and unique. If a number is found that is not valid or not unique, the process moves to step 56 where the network operator is prompted to manually input an abbreviated number. The process then returns to step 55 and checks the manually input number to determine whether it is valid and unique. If not, the operator is prompted to enter another abbreviated number. If the number is valid and unique, the process moves to step 57 where it is determined whether the network operator has chosen to manually override one or more of the automatically generated numbers, even though they are valid and unique. For example, in an organization, the help desk may have an abbreviated number that people have known for years. The network operator may wish to retain this number while the method automatically assigns other abbreviated numbers to the members.

If the network operator has chosen to manually override one or more of the automatically generated numbers, the process returns to step 56 where the network operator is prompted to manually input an abbreviated number. The process then returns to step 55 and checks the manually input number to determine whether it is valid and unique. If the number is valid and unique, the process moves to step 57 where it is once again determined whether the network operator has chosen to manually override one or more of the automatically generated numbers. If not, the process moves to step 58 where the process returns to the beginning and awaits further input by the network operator.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a telecommunications network having a configuration management system, a method of automatically populating a Private Numbering Plan (PNP) subscription with PNP data, said method comprising the steps of:

defining a group, said group comprising a plurality of members who subscribe to a PNP service; and automatically generating said PNP data for each of said plurality of group members when said group is defined.

2. The method in a telecommunications network of claim 1 wherein said steps of defining a group and automatically generating said PNP data are performed by service management application software in said configuration management system.

3. The method in a telecommunications network of claim 1 wherein said step of automatically generating said PNP data includes automatically generating an abbreviated number for each of said plurality of group members.

4. The method in a telecommunications network of claim 3 further comprising, before said step of automatically generating said PNP data, the step of selecting a type of automated service provisioning.

5. The method in a telecommunications network of claim 4 wherein said step of selecting a type of automated service provisioning includes selecting a type of automated service provisioning from a set consisting of incremental number generation, random number generation, and last X digits.

6. The method in a telecommunications network of claim 5 wherein said step of automatically generating said PNP data utilizing incremental number generation includes the steps of:

receiving an increment from a system operator;

obtaining a last abbreviated number generated; and adding said increment to said last abbreviated number generated.

7. The method in a telecommunications network of claim 5 wherein said step of automatically generating said PNP data utilizing random number generation includes the steps of:

receiving from a system operator, a number of digits to be included in each of said abbreviated numbers;

obtaining each group member's telephone number; and utilizing each group member's telephone number as a root to generate an abbreviated number having the number of digits received from the system operator.

8. The method in a telecommunications network of claim 5 wherein said step of automatically generating said PNP data utilizing the last X digits includes the steps of:

receiving from a system operator, a number (X) of digits to be included in each of said abbreviated numbers;

extracting the last X digits of each member's telephone number; and utilizing the extracted digits as the abbreviated number for each of said plurality of members.

9. The method in a telecommunications network of claim 3 further comprising the step of determining whether each generated abbreviated number is valid and unique.

10. The method in a telecommunication, network of claim 9 further comprising the steps of:

receiving from a system operator, a manually input abbreviated number for one of said group members after said step of determining whether each generated abbreviated number is valid and unique;

validating that said manually input abbreviated number is valid;

checking that said manually input abbreviated number is unique; and overriding the automatically generated abbreviated number for said one of said group members.

11. In a telecommunications network having a configuration management system, a method of automatically populating a Private Numbering Plan (PNP) subscription with abbreviated numbers, said method comprising the steps of:

defining a group, said group comprising a plurality of members who subscribe to a PNP service;

selecting a type of automated service provisioning from a set consisting of incremental number generation, random number generation, and last X digits;

automatically generating an abbreviated number for each of said plurality of group members when said group is defined; and determining whether each generated abbreviated number is valid and unique.

12. The method in a telecommunications network of claim 11 further comprising the steps of:

receiving from a system operator, a manually input abbreviated number for one of said group members after said step of determining whether each generated abbreviated number is valid and unique;

validating that said manually input abbreviated number is valid;

checking that said manually input abbreviated number is unique; and overriding the automatically generated abbreviated number for said one of said group members.

13. In a telecommunications network having a configuration management system, a method of automatically populating a Private Numbering Plan (PNP) subscription with PNP data, said method comprising the steps of:

defining a group, said group comprising a plurality of members who subscribe to a PNP service;

selecting a type of automated service provisioning, selected from the group consisting of incremental number generation, random number generation, and utilization of a pre-selected set of digits of a directory number associated with a group member; and automatically generating an abbreviated number for each of said plurality of group members based on the selected automated service provisioning type.

14. The method in a telecommunications network of claim 13 wherein said steps of defining a group and automatically generating an abbreviated number are performed by service management application software in said configuration management system.

15. The method in a telecommunications network of claim 13 wherein said step of automatically generating an abbreviated number based on incremental number generation includes the steps of:

receiving an increment from a system operator;

obtaining a last abbreviated number generated; and adding said increment to said last abbreviated number generated.

16. The method in a telecommunications network of claim 13 wherein said step of automatically generating an abbreviated number based on random number generation includes the steps of:

receiving from a system operator, a number of digits to be included in the generation of said abbreviated number;

obtaining each group member's telephone number; and utilizing each group member's telephone number as a root to generate an abbreviated number having the number of digits received from the system operator.

17. The method in a telecommunications network of claim 13 wherein said step of automatically generating an abbreviated number based on utilization of a pre-selected set of digits of a directory number associated with the group member includes the steps of:

receiving from a system operator, a number of digits to be included in said abbreviated number;

extracting a set of digits of the group member's directory number based on the received number from said system operator; and utilizing the extracted digits of the group member's directory number as the abbreviated number for each of the group members.

18. The method in a telecommunications network of claim 13 further comprising the step of determining whether each generated abbreviated number is valid and unique.

* * * * *